(12) United States Patent
Chang et al.

(10) Patent No.: US 9,036,756 B2
(45) Date of Patent: May 19, 2015

(54) RECEIVER AND METHODS FOR CALIBRATION THEREOF

(71) Applicant: CAMBRIDGE SILICON RADIO LIMITED, Cambridge (GB)

(72) Inventors: Simon Chang, Cambridge (GB); Erik Lindskog, Cupertino, CA (US); Hong Wan, Yangzhou (CN); Rainer Herberholz, Great Abington (GB)

(73) Assignee: CAMBRIDGE SILICON RADIO LIMITED, Cambridge (GB)

( * ) Notice: Subject to any disclaimer, the term of this patent is extended or adjusted under 35 U.S.C. 154(b) by 64 days.

(21) Appl. No.: 13/750,830

(22) Filed: Jan. 25, 2013

(65) Prior Publication Data

US 2014/0211896 A1   Jul. 31, 2014

(51) Int. Cl.
 *H04L 7/00*   (2006.01)
 *H04L 7/04*   (2006.01)
 *H04L 7/033*  (2006.01)

(52) U.S. Cl.
 CPC .............. *H04L 7/042* (2013.01); *H04L 7/0337* (2013.01)

(58) Field of Classification Search
 CPC ..... H04L 7/0337; H04L 7/0334; H04L 7/033; H04L 7/0029; H04L 7/042; H03L 7/091
 USPC .................. 375/355, 316, 343, 371, 373, 354; 348/572, 607, 726; 370/503; 709/248
 See application file for complete search history.

(56) References Cited

U.S. PATENT DOCUMENTS

| | | | |
|---|---|---|---|
| 6,442,220 B1 | 8/2002 | Sihlbom | |
| 7,280,605 B2* | 10/2007 | Cha | 375/260 |
| 7,415,059 B2* | 8/2008 | Chadha et al. | 375/343 |
| 7,912,163 B2* | 3/2011 | Kawai | 375/354 |
| 2003/0112911 A1 | 6/2003 | Barton et al. | |
| 2012/0020677 A1* | 1/2012 | Noguchi et al. | 398/202 |
| 2013/0106632 A1* | 5/2013 | Petigny et al. | 341/120 |

FOREIGN PATENT DOCUMENTS

| | | | |
|---|---|---|---|
| GB | 2354915 | 4/2001 | |
| WO | WO2010/131528 | * 11/2010 | H03L 7/24 |

OTHER PUBLICATIONS

Search Report issued Jul. 14, 2014 in corresponding GB1314685.7.

* cited by examiner

*Primary Examiner* — Dhaval Patel
(74) *Attorney, Agent, or Firm* — Pillsbury Winthrop Shaw Pittman LLP

(57) ABSTRACT

There is disclosed a receiver and associated methods in which a received signal can be sampled at the symbol rate rather than oversampled. This reduction in the sampling frequency compared with conventional receivers lowers power consumption. Quality metrics in receiving the data (e.g. packet error rate, etc) are not adversely affected by setting a programmable phase shift in the sampling frequency. The programmable shift can be selected through a calibration process using a known sequence of symbols, such as the short training field in 802.11 standards.

11 Claims, 3 Drawing Sheets

RECEIVER AND METHODS FOR CALIBRATION THEREOF

TECHNICAL FIELD

The present invention relates to receivers for wireless telecommunications signals, and to methods for calibrating such receivers.

BACKGROUND

A communication signal transmitted over a wireless medium consists of a sequence of symbols. The communication signal has an inherent "symbol rate", corresponding to the rate at which new symbols are transmitted over the medium. Each symbol conveys one or more bits of information, and thus a wireless receiver must be capable of sampling each symbol before the sampled data can be decoded.

In order to sample the signal, receivers generally have one or more analogue to digital converters (ADCs) which are arranged to sample the received signal at a particular sampling rate. To ensure that the receiver samples all received symbols, ADCs are set to sample the received signal at a rate which is significantly higher than the symbol rate of the signal (known as oversampling). In this way, the chances of missing a symbol in the received signal are reduced, and the sample with the highest amplitude can be chosen for any given symbol.

However, the sampling rate of the ADCs has a direct effect on the power consumption of the ADCs and the receiver as a whole. Oversampling a received signal therefore increases the power consumption of the receiver in an undesirable fashion. It would be preferable to find an alternative solution in which the power consumption of the receiver is lower.

SUMMARY OF INVENTION

According to a first aspect of the present invention, there is provided a receiver, comprising: an input, for receiving a received signal having a symbol rate; a clock input, for receiving a clock signal; phase shift means, for applying a programmable phase shift to said clock signal; and an analogue to digital converter, for sampling the received signal at the symbol rate and in accordance with transitions in the phase-shifted clock signal, and generating a sampled signal.

In a second aspect of the present invention, there is provided a method of calibrating a receiver, the receiver comprising an input, for receiving a received signal having a symbol rate; a clock input, for receiving a clock signal; phase shift means, for applying a programmable phase shift to said clock signal; and an analogue to digital converter, for sampling the received signal at the symbol rate and in accordance with transitions in the phase-shifted clock signal, and generating a sampled signal. The method comprises: detecting the presence of a first repetition of a known sequence of symbols in the received signal, and measuring a first correlation strength; altering the programmable phase shift to a different value; detecting the presence of a second repetition of a known sequence of symbols in the received signal, and measuring a second correlation strength; comparing the first correlation strength to the second correlation strength; and on the basis of the comparison, selecting the programmable phase shift.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
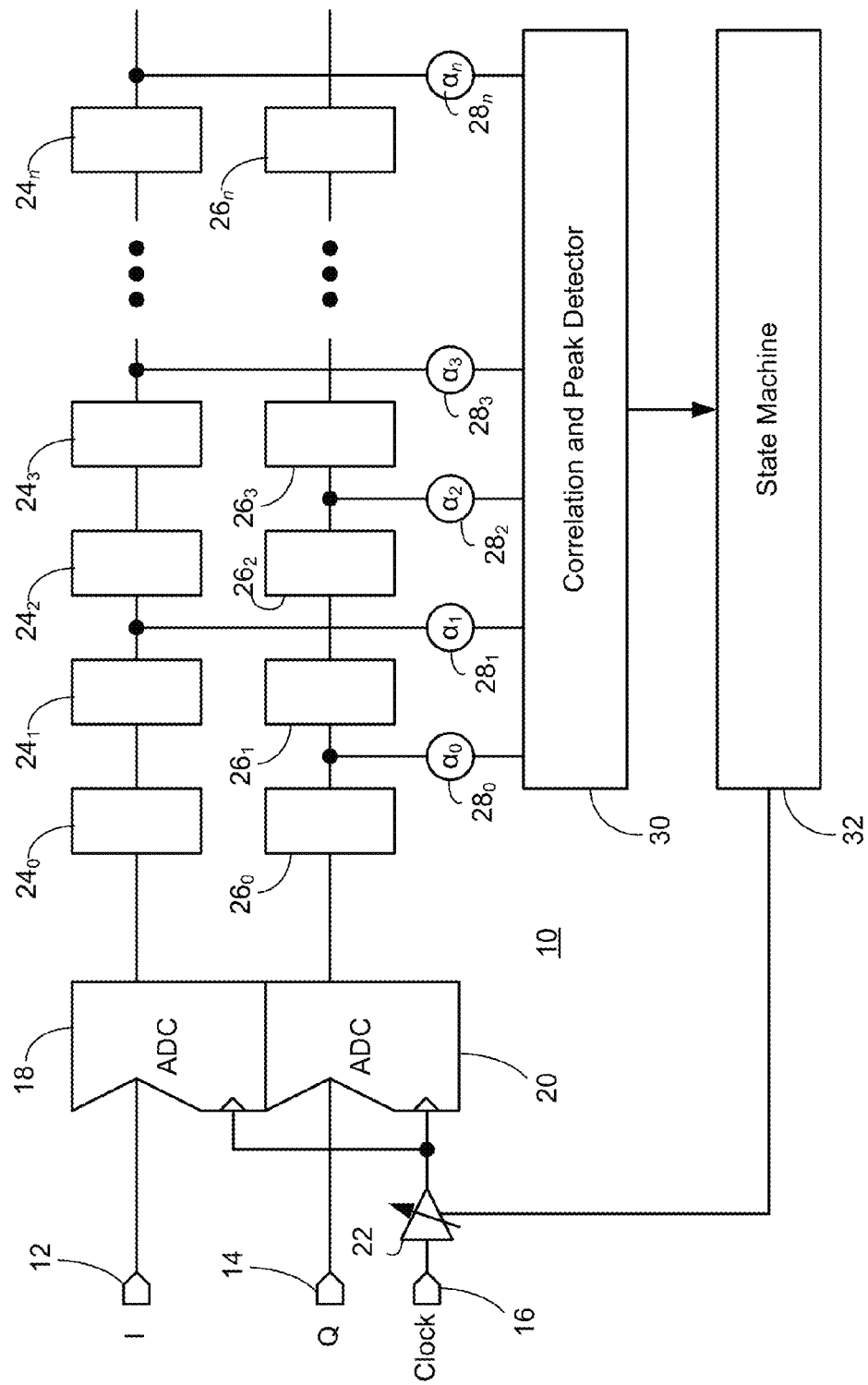
FIG. 1 shows a receiver according to embodiments of the present invention.

FIG. 1 shows a receiver 10 according to embodiments of the present invention. Only those parts of the receiver essential to an understanding of the invention are shown for clarity; those skilled in the art will appreciate that receivers generally comprise far more components than those illustrated.

The receiver 10 comprises a first input 12 for receiving the I (in phase) component of a received signal, and a second input 14 for receiving the Q (quadrature phase) component of the received signal. The received signal comprises a sequence of symbols transmitted over time, each symbol representing one or more bits of information dependent on the transmission modulation scheme. The rate of symbols in the received signal (i.e. a frequency) is referred to as the symbol rate. A further input 16 receives a clock signal, which has the same frequency as the symbol rate. The clock signal may comprise a square wave, for example.

The first and second inputs 12, 14 are connected respectively to first and second analogue-to-digital converters (ADCs) 18, 20, and each ADC 18, 20 is coupled to the clock input 16 in order to receive the clock signal. The ADCs 18, 20 thus sample the received (analogue) signal at a rate defined by the clock signal, and output quantized (digital) signals representing the received signal. For example, the ADCs 18, 20 may be configured to sample the received signal on every up transition of the clock signal, on every down transition of the clock signal, or on every up and down transition of the clock signal as required. The quantized signal can have any number of bits depending on the complexity of the received signal and the complexity of the ADCs 18, 20. The ADCs 18, 20 thus sample the received signal at a rate which is equal to the symbol rate in the received signal.

As described above, the received signal comprises a sequence of symbols transmitted at a symbol rate. That is, a new symbol is transmitted in each of a series of time windows according to the symbol rate. At or near the boundary of one time window with an adjacent time window, the symbol in one window begins to interfere with the symbol in the adjacent time window. If sampled at these points, the signal to noise ratio is reduced. It is therefore important that the received signal is sampled at points within the time windows where the symbol is strongest.

In order to reduce the effects of inter-symbol interference, the receiver 10 further comprises a variable delay cell 22 coupled to the clock signal input 16. The clock signal is thus passed to the delay cell 22, which applies a delay value which can be programmed as described below. The delayed clock signal is then output from the delay cell 22 to the ADCs 18, 20 to control the timing of the sampling. The delay cell 22 may comprise any suitable delay circuit as would be understood by those skilled in the art. The delay cell may be able to apply one of a plurality of possible delay values, with the selection of the appropriate delay value controlled in a manner to be described below.

In order to set the appropriate delay, in some embodiments, the receiver 10 detects the presence of a known sequence of symbols. One example of a known sequence of symbols that can be used for this purpose is the short training field which is common to various wireless standards (including 802.11 standards). In 802.11ad, this sequence consists of 17 repetitions (the last one being inverted) of a 128-symbol sequence (known as $Ga_{128}$) from the set $\{1, -1, j, -j\}$. However, similar sequences can be found in other wireless standards and the present invention is not limited to any particular standard.

The known sequence can be detected from the stream of incoming symbols by cross-correlating it with the expected sequence. In the illustrated embodiment, series of n delay cells (where n is an integer greater than 1) are connected to each ADC 18, 20. For example, where the short training field is used as described above, n=128. So, connected to the output of the ADC 18 (for the I component of the received signal) is a first series of delay cells $24_1, 24_2, \ldots, 24_n$; connected to the output of the ADC 20 (for the Q component of the received signal) is a second series of delay cells $26_1, 26_2, \ldots, 26_n$. A correlation and peak detector 30 is connected to various tap positions in the series of delay cells 24, 26. For example, in the illustrated embodiment, the correlation and peak detector 30 has n tap positions. Even tap positions are coupled at corresponding points to the second series of delay cells 26; odd tap positions are coupled at corresponding points to the first series of delay cells 24. Each tap is multiplied by a corresponding coefficient $\alpha_0, \alpha_1, \ldots, \alpha_n$ in corresponding multiplying components $28_0, 28_1, \ldots, 28_n$. The set of coefficients $\alpha_0, \alpha_1, \ldots \alpha_n$ corresponds to the known sequence, such that the collected outputs of the multiplying components $28_0, 28_1, \ldots, 28_n$ is greatest when the received signal corresponds to the known sequence.

When a correlation is found by the correlation and peak detector 30 (e.g. if the collected output of the multiplying components $28_0, 28_1, \ldots, 28_n$ is above a threshold), it outputs a control signal to a state machine 32, signifying the presence of a peak and also the strength of the peak. On the basis of that control signal, the state machine 32 adjusts the delay applied by the delay cell 22. For example, different values of the delay can be tested and the value of the correlation measured for each delay. The delay value in which the best correlation was achieved can then be selected as the delay value for future use of the receiver 10.

Figure 2:
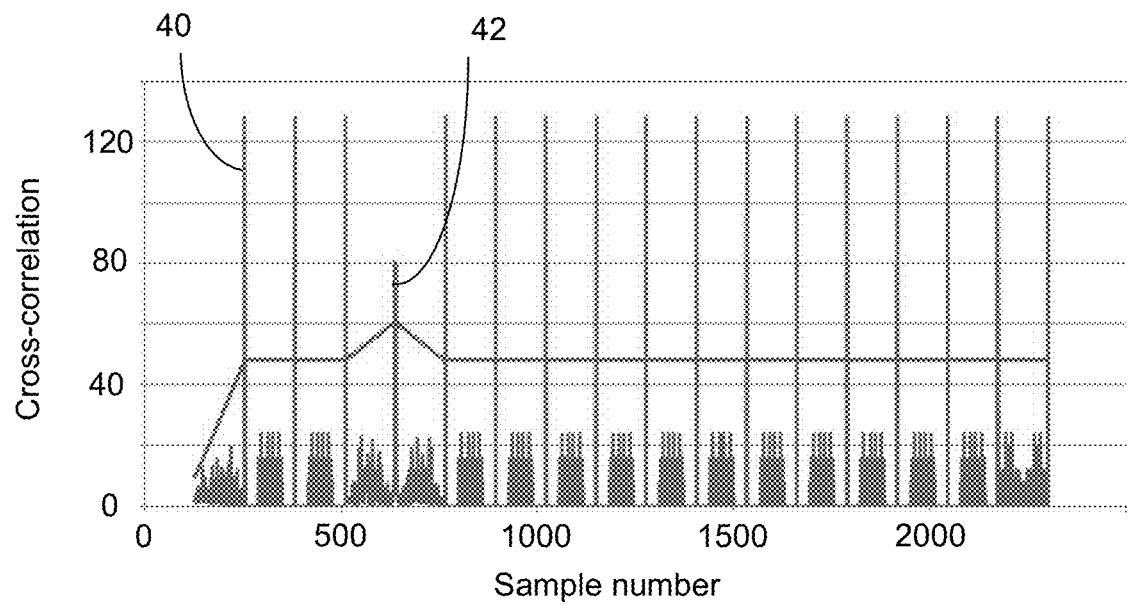
FIG. 2 is a graph showing sampling of a received signal.
Figure 3:
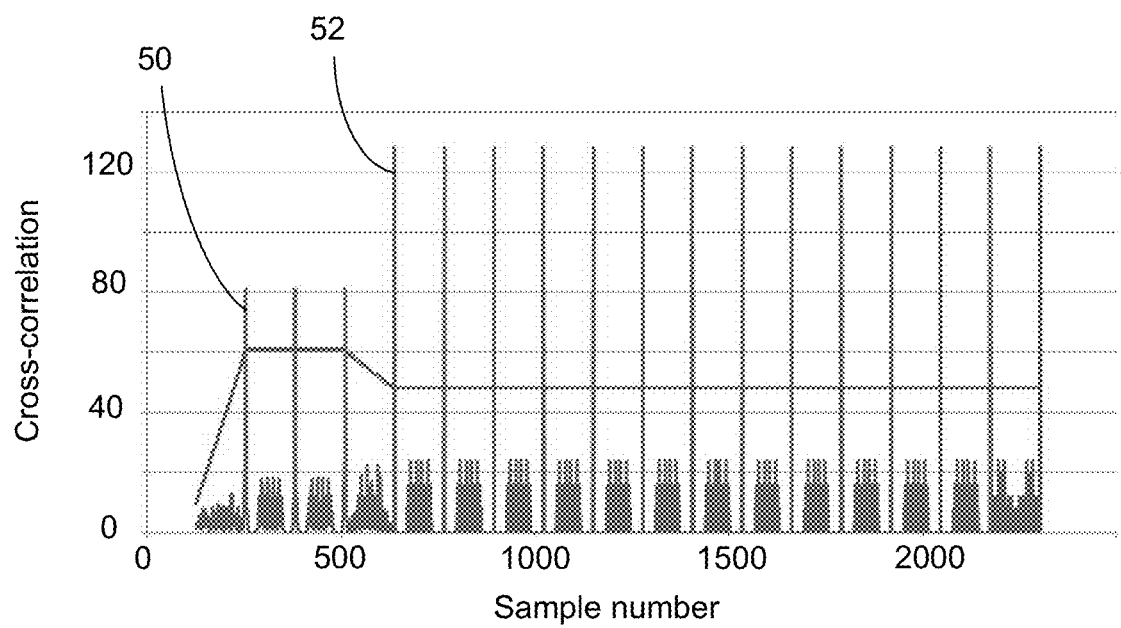
FIG. 3 is a further graph showing sampling of a received signal.

This process is shown further in FIGS. 2 and 3, each of which illustrated possible outputs of the correlation and peak detector 30 with sample number. These graphs show examples where the delay cell 22 is capable of applying only two delay values corresponding to an integer number of sampling periods (or no delay at all) and a half-integer number of sampling periods. However, those skilled in the art will appreciate that the scheme could be widened to delay cells having more than two possible delay values.

In FIG. 2, the correlation and peak detector 30 detects the presence of a first repetition of a known sequence of symbols (e.g. the first repetition of the short training field) and outputs a peak 40. The delay applied in the delay cell 22 is set to an arbitrary value. Repeated peaks show the presence of further repetitions of the known sequence.

After three repetitions, the calibration begins and a new value of the delay is selected (e.g. the delay is shifted by half a sampling period). The next peak (reference 42) is markedly lower than the previous peaks, so the correlation with the known sequence is less strong. In that case, it is clear that the initial delay applied by the delay cell 22 was better (and there are no further possible values), and the state machine can control the delay cell 22 to apply the original delay value.

In FIG. 3, the correlation and peak detector 30 detects the presence of a first repetition of a known sequence of symbols (e.g. the first repetition of the short training field) and outputs a peak 50. The delay applied in the delay cell 22 is set to an arbitrary value. Repeated peaks show the presence of further repetitions of the known sequence.

After three repetitions, the calibration begins and a new value of the delay is selected (e.g. the delay is shifted by half a sampling period). The next peak (reference 52) is markedly higher than the previous peaks, so the correlation with the known sequence is stronger. In that case, it is clear that the new delay applied by the delay cell 22 is better (and there are no further possible values), and the state machine can control the delay cell 22 to apply the new delay value.

In extending the scheme to more than two delay values, the state machine 32 can apply each of the possible delay values in the delay cell 22 and record the correlation peak for each value. The delay value associated with the highest peak can then be selected as the appropriate delay to be applied in future.

Note that it is possible that changing the delay values will result in a shift in the peak positions relative to one another. For example, the difference between the "original" delay value and the "new" delay value may be greater than one symbol period. In that case, the gap between peaks may not be equal in length to one repetition of the known sequence. In order to counteract this problem, the state machine 32 may detect the cross-correlation magnitudes over a range of samples centred on the sample where the greatest cross-correlation is expected. The sample in that range with the greatest cross-correlation is then chosen to represent the strength of the cross-correlation at the new delay value. For example, take the case where the known sequence comprises repetitions of the 128-symbol $Ga_{128}$ sequence. Once the new delay value is applied, the state machine 32 may detect cross-correlation values 126, 127, 128, 129 and 130 samples after the previous peak. The sample with the greatest cross-correlation value can be taken as representing the value of cross-correlation with the new delay value (which may be compared to the cross-correlation with the previous delay value), and future peaks can be detected 128 samples following the new peak.

In both of these examples it has been assumed that the clock delay can be adjusted substantially instantaneously, i.e. before the next repetition of the known sequence of symbols. It is possible that this will not be the case in practical realizations, and there will be a delay between the decision to change the value of the delay and the delay value actually being changed. In these circumstances the measurement of the subsequent peak (i.e. for the subsequent repetition of the known sequence) may not be valid. Thus in one embodiment, at least two measurements of the correlation may be acquired for each delay value, before the delay is changed. In this way, at least the second measurement will be free from transient errors, and can be compared reliably with measurements for other delay values.

Figure 4:
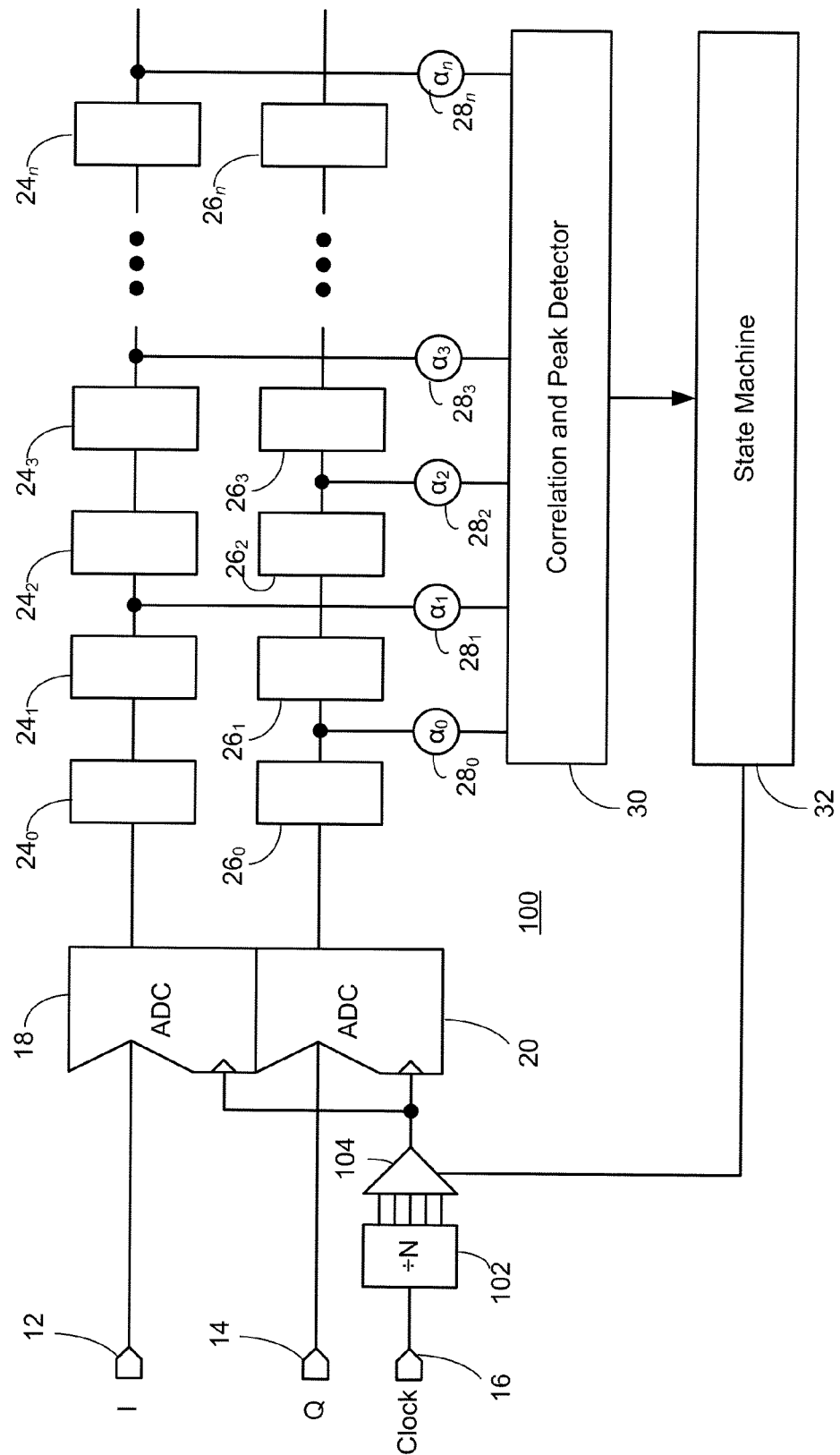
FIG. 4 shows a receiver according to further embodiments of the present invention.

While FIG. 1 shows a receiver 10 comprising a variable delay cell 22, it will be apparent to those skilled in the art that alternative means may be employed to shift the clock signal as required. For example, FIG. 4 shows a receiver 100 according to further embodiments of the invention, in which the delay cell 22 is replaced with an alternative phase-shifting mechanism. The other components of the receiver 100 are the same and therefore like reference numerals are used where appropriate.

In FIG. 4, the clock signal has a much higher frequency that the symbol rate. A divider 102 receives the clock signal and divides it down to the required sampling frequency (e.g. equal to the symbol rate). A plurality of subdivided clock signals appear at the output of the divider 102, all shifted in phase relative to each other. A multiplexer 104 can then be used to select the appropriate phase-shifted subdivided clock signal as dictated by the state machine 32.

Embodiments of the present invention thus provide a receiver and associated methods in which a received signal can be sampled at the symbol rate rather than oversampled. This reduction in the sampling frequency compared with conventional receivers lowers power consumption. Quality metrics in receiving the data (e.g. packet error rate, etc) are not adversely affected by setting a programmable phase shift in the sampling frequency. The programmable shift can be selected through a calibration process using a known sequence of symbols, such as the short training field in 802.11 standards.

Those skilled in the art will appreciate that various amendments and alterations can be made to the embodiments described above without departing from the scope of the invention as defined in the claims appended hereto.

What is claimed is:

1. A receiver, comprising:
    an input, for receiving a received signal having a symbol rate;
    a clock input, for receiving a clock signal;
    phase shift means, for applying a programmable phase shift to said clock signal;
    an analogue to digital converter, for sampling the received signal at the symbol rate and in accordance with transitions in the phase-shifted clock signal, and generating a sampled signal;
    control means configured to set the programmable phase shift; and
    a correlation detector for detecting the presence of a known sequence of symbols in the received signal,
    wherein:
        the correlation detector is configured to detect the presence of a first repetition of the known sequence of symbols in the received signal, and measure a first correlation strength;
        the control means is configured to alter the programmable phase shift to a different value;
        the correlation detector is configured to detect the presence of a second repetition of the known sequence of symbols in the received signal, and measure a second correlation strength; and
        the control means is configured to compare the first correlation strength to the second correlation strength and, on the basis of the comparison, select the programmable phase shift.

2. The receiver according to claim 1, wherein the known sequence of symbols is $Ga_{128}$.

3. The receiver according to claim 1, wherein the phase shift means comprises a programmable delay cell.

4. The receiver according to claim 3, wherein the clock signal has a frequency equal to the symbol rate.

5. The receiver according to claim 1, wherein the phase shift means comprises:
    a divider arranged to divide the clock signal into a plurality of subdivided clock signals, each having a different phase shift; and
    a selector arranged to select one of the subdivided clock signals.

6. The receiver according to claim 5, wherein each of the subdivided clock signals has a frequency equal to the symbol rate.

7. The receiver according to claim 1, wherein the phase shift means is arranged to apply one of a plurality of different phase shift values to said clock signal.

8. The receiver according to claim 7, wherein the plurality of different phase shift values is two different phase shift values.

9. A method of calibrating a receiver, the receiver comprising an input, for receiving a received signal having a symbol rate; a clock input, for receiving a clock signal; phase shift means, for applying a programmable phase shift to said clock signal; and an analogue to digital converter, for sampling the received signal at the symbol rate and in accordance with transitions in the phase-shifted clock signal, and generating a sampled signal, the method comprising:
    detecting the presence of a first repetition of a known sequence of symbols in the received signal, and measuring a first correlation strength;
    altering the programmable phase shift to a different value;
    detecting the presence of a second repetition of the known sequence of symbols in the received signal, and measuring a second correlation strength;
    comparing the first correlation strength to the second correlation strength; and
    on the basis of the comparison, selecting the programmable phase shift.

10. The method according to claim 9 wherein altering the programmable phase shift comprises applying one of two different phase shift values to said clock signal.

11. The method according to claim 9, wherein altering the programmable phase shift comprises:
    dividing the clock signal into a plurality of subdivided clock signals, each having a different phase shift; and
    selecting one of the subdivided clock signals.

* * * * *